United States Patent [19]

Kurashina et al.

[11] Patent Number: 4,926,279
[45] Date of Patent: May 15, 1990

[54] MAGNETIC TAPE CASSETTE
[75] Inventors: Satoru Kurashina; Hiroshi Meguro, both of Miyagi, Japan
[73] Assignee: Sony Corporation, Tokyo, Japan
[21] Appl. No.: 281,761
[22] Filed: Dec. 9, 1988
[30] Foreign Application Priority Data
Dec. 29, 1987 [JP] Japan .......................... 62-199244[U]
[51] Int. Cl.⁵ .......................................... G11B 23/087
[52] U.S. Cl. .................................................. 360/132
[58] Field of Search ........................ 360/132; 242/199
[56] References Cited
U.S. PATENT DOCUMENTS 4,572,461 2/1986 Horikawa et al. .................. 360/132
4,625,253 11/1986 Kawakami et al. .................. 360/132
4,644,433 2/1987 Horikawa et al. .................. 360/132
4,646,190 2/1987 Meguro .............................. 360/132
4,789,113 12/1988 Katagiri et al. ..................... 360/132

Primary Examiner—Robert S. Tupper
Attorney, Agent, or Firm—Lewis H. Eslinger; Jay H. Maioli

[57] ABSTRACT

A magnetic tape cassette has a slidable braking member for controlling the rotation of reel hubs about which a magnetic tape is wound. In order to facilitate the process of assembling the magnetic tape cassette, the braking member is temporarily secured to an upper part of the cassette housing with a light pressure at a position outside its normal slidable range. After the completion of the assembly, the braking member is disengaged from the upper part of the cassette housing, and thereafter it moves only within its normal slidable range in order to lock or release the reel hubs.

5 Claims, 6 Drawing Sheets

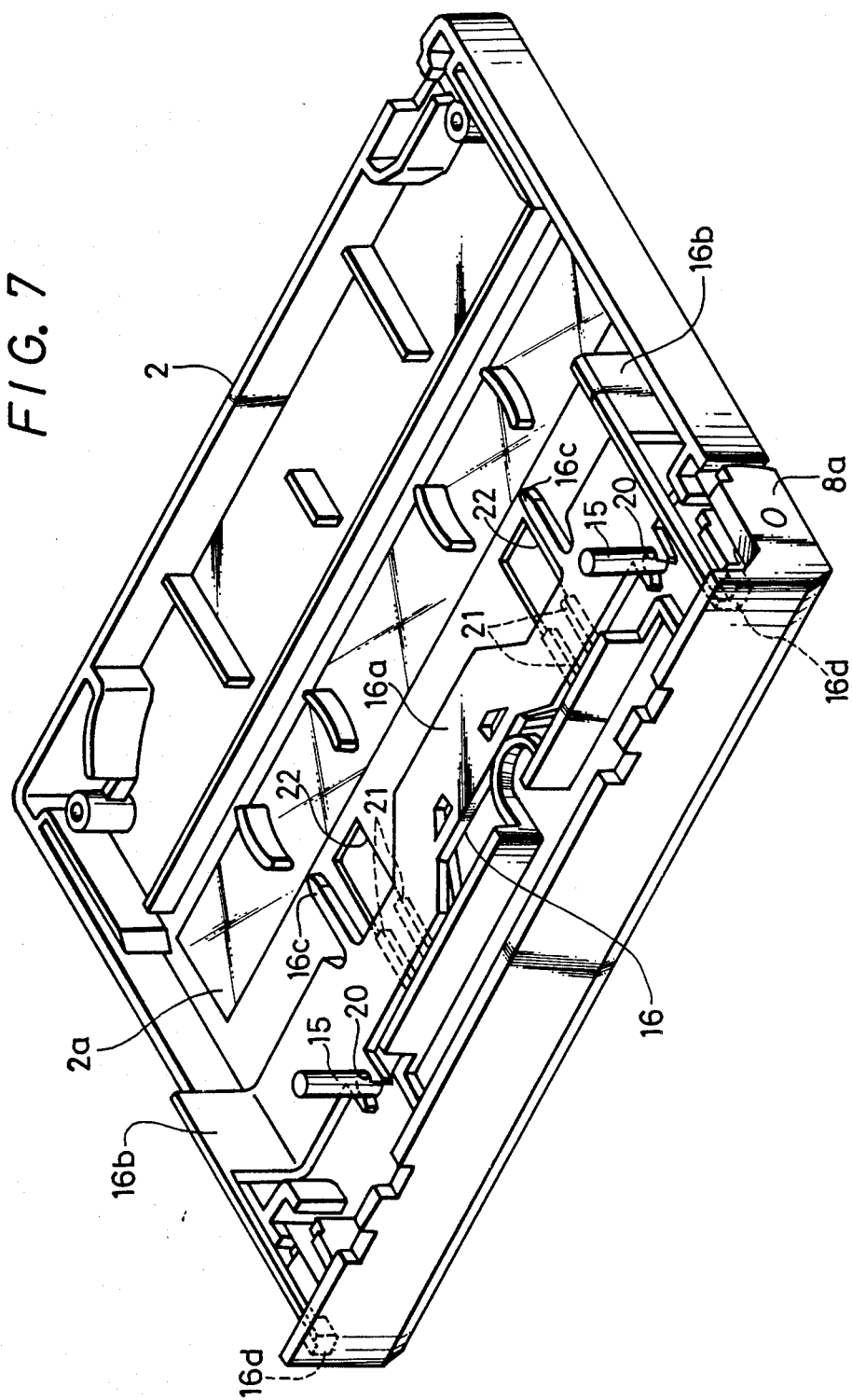

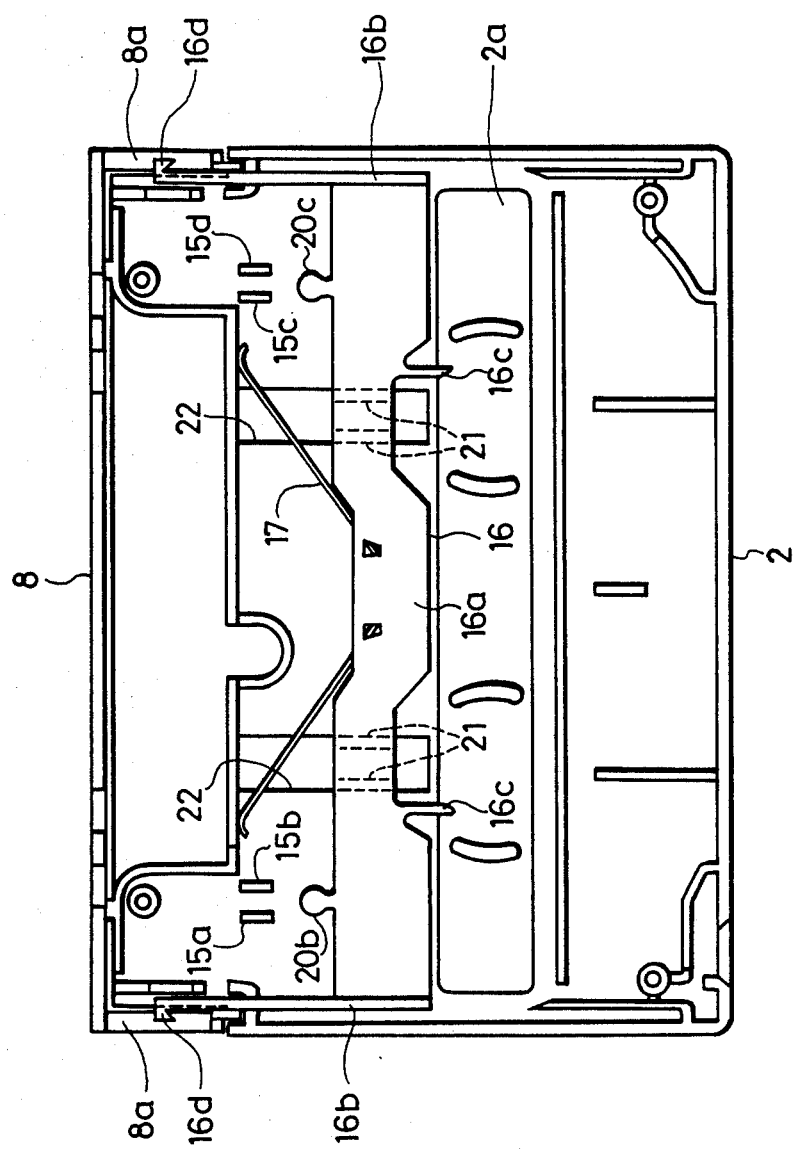

MAGNETIC TAPE CASSETTE

BACKGROUND OF THE INVENTION

1. Field of the Invention

The present invention relates generally to magnetic tape cassettes and more particularly to a magnetic tape cassette suitable for use in recording a digital signal such as a PCM (pulse code modulated) signal.

2. Description of the Prior Art

A PCM recording and/or reproducing apparatus has been previously proposed for recording an analog audio signal on a magnetic tape or reproducing the same therefrom in the form of a digital signal such as a PCM signal. The known PCM recording and/or reproducing apparatus employs a rotary head to provide a recording in which the PCM signal is recorded with relatively high density. In the PCM recording and/or reproducing apparatus using the rotary head, upon recording and/or reproduction, the magnetic tape is withdrawn from a magnetic tape cassette and wrapped around a rotary drum on which the rotary head is mounted. The recording and/or reproducing is performed under this state.

In a magnetic tape cassette in which a magnetic tape of the type described above is incorporated, when the magnetic tape is smudged with fingerprints, oily compounds, dust or the like, a drop-out occurs in the reproduced signal. Therefore, the magnetic tape has to be sealed as tightly as possible so that it can be protected from fingerprints, dust, smudges and the like.

A magnetic tape cassette shown in FIGS. 1 to 5 has previously been proposed for such a purpose. FIG. 1, which is a perspective view of the conventional magnetic tape cassette, shows a cassette housing represented by reference numeral 1. This cassette housing 1 comprises an upper half or part 2 and a lower half or part 3, which are secured together by suitable conventional means such as screws (not shown). A transparent window plate 2a is provided integrally on the top surface of the upper part 2 so that the amounts of tape wound on each reel can be visually confirmed. Within the cassette housing 1, a pair of reel hubs 4 are rotatably inserted into a pair of reel shaft insertion apertures 5 (refer to FIG. 2) that are formed in the lower part 3 at respectively predetermined positions. A magnetic tape 6 is wound around the pair of reel hubs 4.

FIG. 2, which is a perspective, exploded view of the conventional tape cassette of FIG. 1, shows upper and lower inserts 6a, 6b made of a material having a low coefficient of sliding friction with the magnetic tape 6 and respectively having guiding ribs 6c, 6d serving the purpose of ensuring that the magnetic tape 6 is wound smoothly and evenly on the reel hubs 4. The ribs 6c of the upper insert 6a are convex downwards (towards the magnetic tape), and the ribs 6d of the lower insert 6b are convex upwards (also towards magnetic tape 6).

FIG. 2 also shows tape guide posts 7 that are formed on the lower part 3 at its front portion, one of the guide posts 7 being at a position near the right side wall of the lower part 3 and the other of the guide posts 7 being at a position near the left side wall of the lower part 3. The magnetic tape 6 is guided by the tape guide posts 7 so that it can be transported along a predetermined path at the front portion of the cassette housing. A cut-away recess portion 3a of a substantially rectangular configuration having a predetermined width is formed on the lower part 3 in such a manner as to oppose the rear side of the magnetic tape 6 guided between the tape guide posts 7. Upon recording or reproduction, a magnetic tape withdrawing guide system of a recording and/or reproducing apparatus (not shown) is inserted into this cut-away recess portion 3a in order to withdraw the magnetic tape 6 so that it can be wrapped around the rotary drum as explained above.

A front lid 8 is rotatably supported on the front portion of the cassette housing 1 by right and left arm portions 8a of the lid 8 so as to open and/or close the front of the cassette housing 1 in which the magnetic tape 6 is contained. When the tape cassette is not in use, the front lid 8 closes the front portion of the cassette housing 1 so that the cassette housing 1 completely encloses and protects the magnetic tape 6.

A slidable plate member or slider 9 is mounted on the lower surface side of the lower part 3 of the cassette housing 1 so as to move slidably in the front to back direction (from left to right in FIGS. 3 and 4). As FIG. 2 shows, apertures 10 corresponding to the reel shaft insertion apertures 5 are formed in the bottom portion of the slider 9 so that the apertures 10 communicate with the apertures 5 when the slider 9 is slidably moved backward so as to open the recess portion 3a of the lower part 3. Two pairs of apertures 12a, 12b are formed in the bottom portion of the slider 9 at its front right and left sides with a predetermined spacing therebetween. These apertures 12a, 12b are elastically engageable with a pair of right and left slide plate locking members 11 provided on the bottom portion of the lower part 3 when the slider 9 is slidably moved to its forwardmost position or its rearmost position.

A pin 13 is centrally implanted on the bottom portion of the slider 9 at its front end. This pin 13 is engaged with a torsion spring 14 at its coil portion. One end portion of the torsion spring 14 is engaged with the front wall 3b of the lower part 3 and the other end portion thereof is engaged with the front edge of the slider 9 so that the slider 9 is spring-biased by the torsion spring 14 in such a manner that it is always urged to slide forward.

When the tape cassette is being stored and in general when it is not being used, the slider 9 is placed in its forwardmost position to close the recess portion 3a and the reel shaft insertion apertures 5 of the cassette housing 1 as shown in a side view forming FIG. 3. Under this condition, the slider locking members 11 are engaged in the rear engaging apertures 12a to keep the slider 9 in the position in which it closes the recess portion 3a and the apertures 5 of the cassette housing 1. When the tape cassette is loaded into the magnetic recording and/or reproducing apparatus (not shown), the mechanism of the magnetic recording and/or reproducing apparatus releases the slider locking members 11 from the rear engaging apertures 12a, and the slider 9 is slidably moved backward (or towards the right in FIG. 3) against the spring force of the torsion spring 14 to expose the recess portion 3a and the reel shaft insertion apertures 5 of the cassette housing 1. Under this condition, the slider locking members 11 are engaged in the front engaging apertures 12b to keep the slider 9 in its opened state (FIG. 4).

FIGS. 2 to 4 show a pair of limiter pins 15 formed on the inner surface of the upper part 2 at positions that respectively correspond to the positions of the left and right slide plate locking members 11 of the lower part 3. The lower ends of the limiter pins 15 are respectively opposed to the top surfaces of the slider locking members 11 with a predetermined spacing as shown in FIGS. 3 and 4. Thus, when the slider locking members 11 are warped inwardly too much, the lower ends of the limiter pins 15 come in contact with the slider locking members 11 to prevent the slider locking members 11 from being broken or excessively deformed.

On the inside of the upper and lower parts 2 and 3 of the cassette housing 1, there is provided a reel braking member 16 that prevents the tape reels 4 from being inadvertently or unintentionally rotated by shock and so on (FIG. 2) and therefore prevents the magnetic tape 6 from becoming slack.

As FIG. 2 shows, this reel braking member 16 is mainly formed of an upper surface supporting plate portion 16a extending along the inner surface of the upper part 2 and left and right leg plate portions 16b elongated downwardly from both end portions of the upper surface supporting plate portion 16a so that the reel braking member 16 has a cross section substantially in the shape of the letter U. The upper surface supporting plate 16a has formed on its rear edge a pair of braking protrusions 16c corresponding to ratchet wheel portions 4a formed around both of the reel hubs 4. The lower ends of the leg portions 16b are extended forward to form operation members 16d at their ends.

A spring 17 is attached to the upper surface supporting portion 16a of the braking member 16 at its central portion. This spring 17 has its ends extended so that it has substantially the shape of the letter V, and these ends of the spring 17 are brought into contact with and bear against the rear surface of the front wall of the upper part 2.

When the tape cassette is not in use, and in general whenever the front lid 8 is closed, the braking member 16 is slid backward by the force of the spring 17 so that the protrusions 16c engage with the ratchet wheels 4a of the reel hubs 4 as shown in FIG. 3 and the reel hubs 4 are prevented from rotating. When the front lid 8 is opened by upward rotation (clockwise rotation is moving from the position shown in FIG. 3 to that shown in FIG. 4), the ends of the arm portions 8a of the front lid 8 press the operation members 16d of the reel braking member 16 so that the reel braking member 16 is slidably moved forward against the spring-biasing force of the spring 17 to release the protrusions 16c from the ratchet wheels 4a of the reel hubs 4, thus allowing the reel hubs 4 to rotate as shown in FIG. 4.

When a magnetic tape cassette having the braking member 16 is assembled in the conventional manner, the magnetic tape 6 wrapped around the reel hubs 4 is first assembled on the lower part 3 and then the braking member 16 is assembled. In this assembly process, however, the presence of the spring 17 is so disturbing that the braking member 16 cannot be assembled at the predetermined position without difficulty. Also, while the lower part 3 on which the magnetic tape 6 and the braking member 16 are temporarily assembled is being conveyed on the assembly line, the braking member 16 frequently comes out of the lower part 3.

To avoid this problem, it has been recently proposed to modify this kind of magnetic tape cassette so that, during the assembly, a braking member is temporarily assembled on the upper part beforehand in the manner disclosed in Japanese laid-open utility model Gazette No. 62-39283.

This previously-proposed tape cassette is illustrated in FIG. 5, which is a fragmentary, cut-away side view of the upper part 2 in an inverted position. As FIG. 5 shows, openings 18 of rectangular configuration are formed in left and right portions of the upper supporting plate portion 16a of the braking member 16 along the direction in which the braking member 16 is slidably moved. The length of each of the rectangular openings 18 is equal to the length of the stroke made by the braking member 16 when it is engaged with or disengaged from the reel hubs 4. In correspondence with the rectangular openings 18, caulking pins 19 are formed monolithically on the lower surface of the upper part 2 and respectively inserted in the rectangular openings 18 of the braking member 16. Under this condition, the top portions (as shown in FIG. 5) of these caulking pins 9 are melted by ultrasonic welding or the like to form head portions 19a whereby the braking member 16 is slidably supported on the upper part 2.

In the temporary assembly of the braking member in this prior art magnetic tape cassette, a somewhat complicated process is required to caulk the caulking pins 19. Also, depending upon the caulking conditions and so on, a so-called sagging sometimes occurs below the neck portions of the head portions 19a of the caulking pins 19, and this sagging frequently modifies the rectangular openings 18 of the braking member 16 in a manner that is deleterious to the operation of the braking member 16. In particular, after the magnetic tape cassette is fully assembled, upon use, the braking member 16 cannot be operated smoothly and cannot follow the opening and/or closing operation of the front lid 8 so that the reel hubs 4 cannot be locked positively, thereby allowing slackening of the magnetic tape 6. Moreover, when such a magnetic tape cassette is loaded into the recording and/or reproducing apparatus, jamming or misloading sometimes occurs.

OBJECTS AND SUMMARY OF THE INVENTION

An object of the present invention is to provide an improved magnetic tape cassette that avoids the problems encountered with the prior art.

Another object of the invention is to provide a magnetic tape cassette constructed so that, during its assembly, a braking member can be temporarily secured to a part thereof in such a manner as to facilitate the assembly process.

Another object of the invention is to provide a magnetic tape cassette in which, after the assembly is completed, a braking member can be slid smoothly.

Another object of the invention is to provide a magnetic tape cassette that always loads properly (i.e., avoids mis-loading) into a recording and/or reproducing apparatus.

In accordance with the present invention, a magnetic tape cassette is provided having a cassette housing formed of an upper part and lower part combined during assembly to form a unit, a front lid that can be moved between an open position in which it opens the cassette housing and a closed position in which it closes the cassette housing, a pair of reel hubs rotatably mounted within the cassette housing for winding a tape thereon, a braking member mounted within the cassette housing in such a manner as to be slidable in a front to back direction, and means for moving the braking member slidably over a given range backward to lock the reel hubs from being rotated when the front lid is moved to the closed position and forward to release the reel hubs from a locked state when the front lid is moved to the open position, the magnetic tape cassette comprising: a fixed portion provided on the upper part; and an engaging portion provided on the braking member, the engaging portion being engageable with the fixing portion with a small pressure when the braking member is located at a position outside said range, whereby the braking member can be temporarily secured to the upper part by engaging the engaging portion with the fixing portion with a small pressure during assembly and released after the upper part and the lower part are combined to form said unit, the braking member then becoming slidable only within said range.

These and other objects, features and advantages of the present invention will become apparent from the following detailed description of the preferred embodiments, to be taken in conjunction with the accompanying drawings, throughout which like reference numerals identify like elements and parts.

BRIEF DESCRIPTION OF THE DRAWINGS

FIG. 7 is a perspective view thereof;

FIG. 12 is a plan view of another embodiment of the magnetic tape cassette according to the present invention.

DESCRIPTION OF THE PREFERRED EMBODIMENTS

Figure 1:
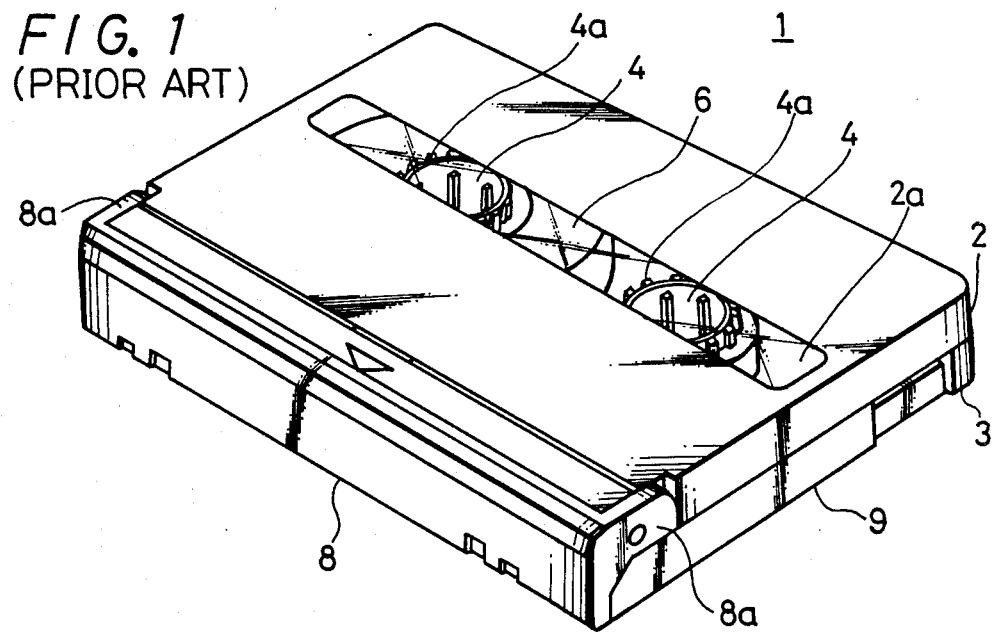
FIG. 1 is a perspective view illustrating an example of a conventional magnetic tape cassette.
Figure 3:
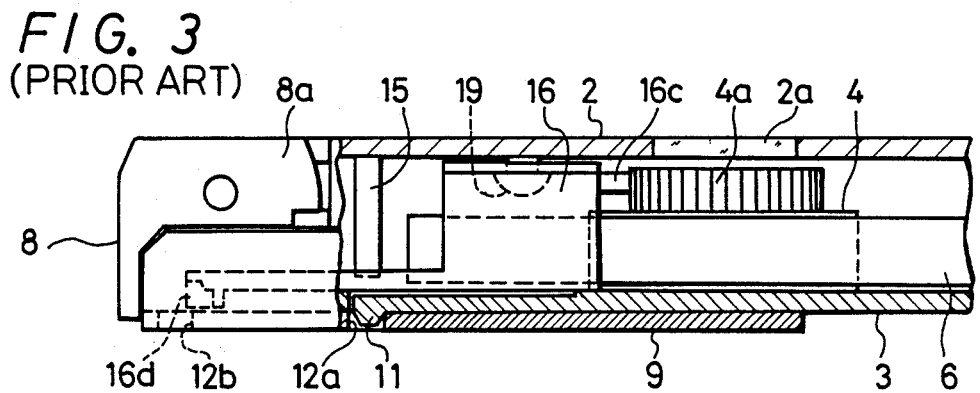
FIG. 3 is a fragmentary, cut-away side view of the conventional magnetic tape cassette shown in FIG. 1 when it is being stored (i.e., not being used)
Figure 4:
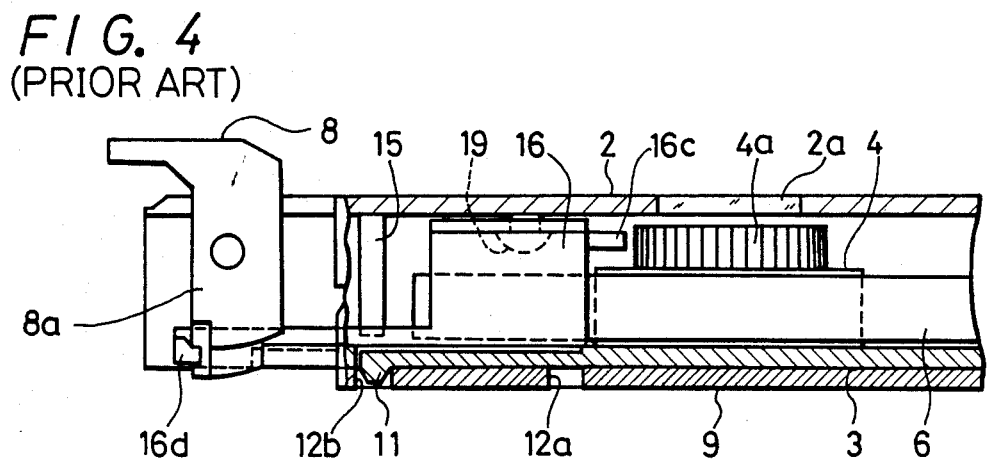
FIG. 4 is a fragmentary, cut-away side view of the conventional magnetic tape cassette shown in FIG. 1 when it is being used.
Figure 2:
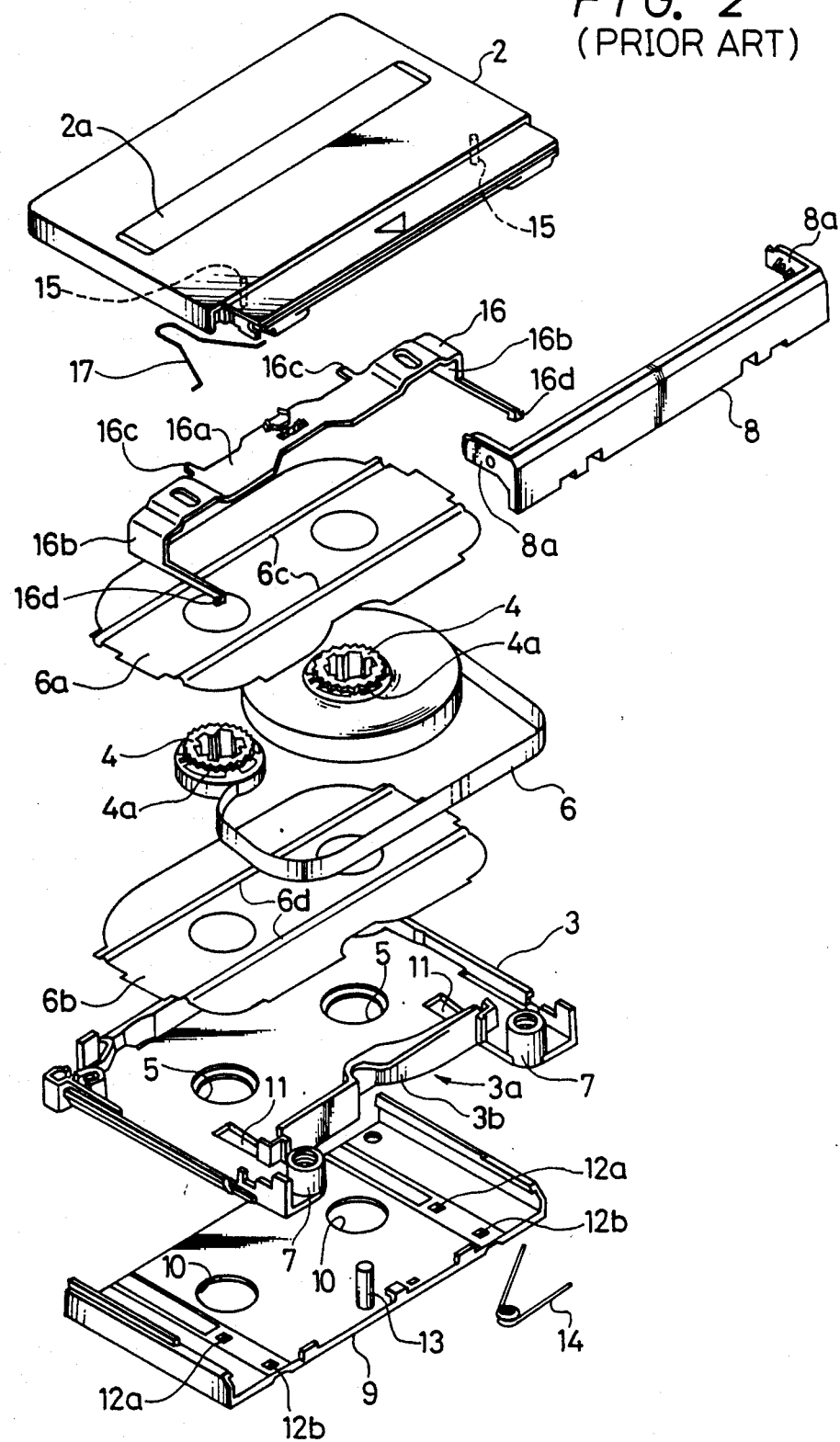
FIG. 2 is a perspective, exploded view of the conventional magnetic tape cassette shown in FIG. 1.
Figure 5:
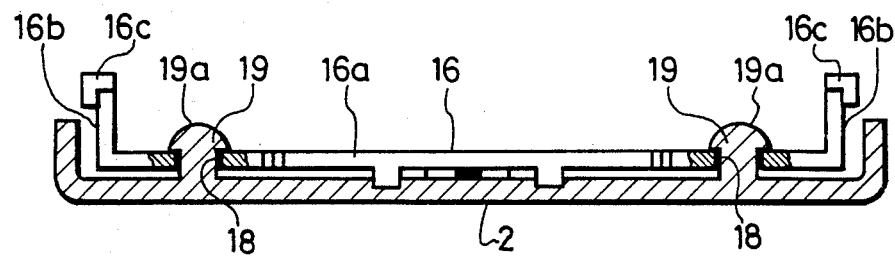
FIG. 5 is a cross-sectional view illustrating a braking member supporting structure of the conventional magnetic tape cassette.

FIGS. 6 to 12 illustrate the preferred embodiments of the present invention. In those figures, parts corresponding to those of FIGS. 1 to 5 are marked with the same references and therefore need not be again described in detail.

FIGS. 6 to 11 illustrate a first embodiment of the present invention. In this embodiment, instead of the rectangular openings 18 formed in the upper surface supporting plate portion 16a of the braking member 16 and the caulking pins 19 formed on the upper part 2, as in the example of the prior art shown in FIG. 5, a pair of left and right projections 20A respectively having engaging recesses 20 protrude from the front edge of the upper surface supporting plate portion 16a of the braking member 16. These recesses 20 are engageable with fixing portions formed on the upper part 2. In this embodiment, the fixing portions are the limiter pins 15 which are used to prevent the slider locking members 11 from being broken in the conventional magnetic tape cassette mentioned above.

Figure 6:
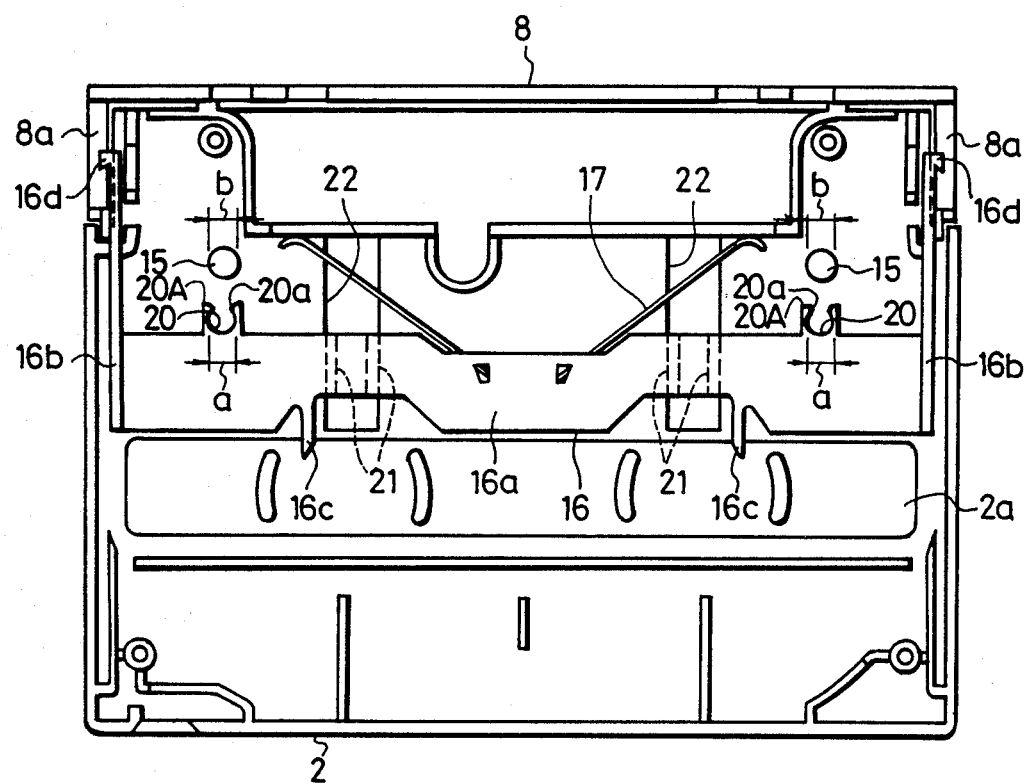
FIG. 6 is a bottom plan view of an embodiment of an upper part of a magnetic tape cassette according to the present invention and illustrating the temporary fastening of a braking member during assembly.

As FIG. 6 shows, each of the recesses 20 is provided with a narrow opening portion 20a. Also, the inner diameter a of the recess 20 is selected to be slightly smaller than the outer diameter b of the limiter pin 15 provided as the fixing portion so that when the recess 20a is engaged with the limiter pin 15, the opening portion 20a is widened so as to enable the recess 20 to be engaged with the limiter pin 15 with a small pressure.

With this structure, a positional relationship between the recess 20 and the limiter pin 15 as the fixing portion is determined such that when the reel braking member 16 is placed at its forwardmost position where the front lid 8 is opened at maximum, or at the position where the reel braking member 16 is disengaged from the reel hub 4, the recess 20 is engaged with the limiter pin 15 provided as the fixing portion. The position of the limiter pin 15 provided as the fixing portion and the position at which the recess 20 is formed in the braking member 16 are chosen so that the recess 20 can be engaged with the limiter pin 15 with a small pressure at a position that lies ahead (i.e., forward) of the forwardmost sliding position of the braking member 16.

Convex strips 21 (FIGS. 6 and 7) are formed at predetermined left and right portions of the upper surface supporting plate portion 16a of the braking member 16. Each convex strip 21 extends in the same direction in which the braking member 16 is slidably moved. In association with the convex strips 21, guide grooves 22 of predetermined length are formed on the rear surface of the upper part 2. The grooves 22 are elongated in the direction in which the braking member 16 is slidably moved.

The rest of the structure shown in FIGS. 6 and 7 is the same as that of the example of the prior art shown in FIGS. 1 to 5.

Figure 8:
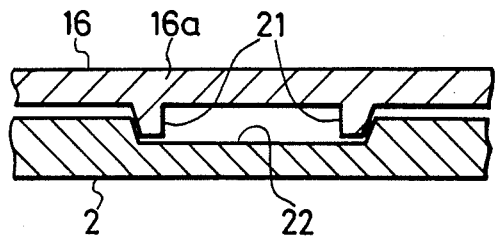
FIG. 8 is an enlarged, cross-sectional view of a main portion of the present invention.

When the magnetic tape cassette of this embodiment of the invention is assembled, the braking member 16 is temporarily secured to the upper part 2 by engaging the limiting pins 15 in the recesses 20 with a small pressure as described above. The recesses 20 can be easily guided for engagement with the limiter pins 15 with a small pressure by first engaging the convex strips 21 formed on the braking member 16 with the guide grooves 22 formed on the upper part 2, as shown in FIGS. 6 to 8.

Then, the upper part 2 to which the braking member 16 is temporarily secured and the lower part 3 on which the magnetic tape 6 or the like is partly assembled are combined to form a single unit. In this manner a magnetic tape cassette is assembled with ease.

Figure 9:
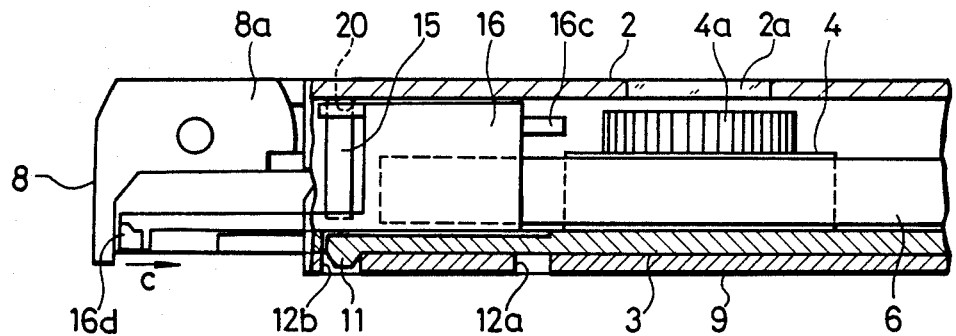
FIG. 9 is a fragmentary, cut-away side view illustration a braking member temporarily fastened to an upper part of the tape cassette of the present invention.

Immediately upon completion of the process of assembly described above, the braking member 16 is temporarily secured to the upper part 2 as shown in FIG. 9. In that condition, if the operation members 16d of the braking member 16 are moved backward (in the direction shown by an arrow c in FIG. 9), the engagement between the recesses 20 and the limiter pins 15 is released to allow the braking member 16 to be moved slidably.

Figure 10:
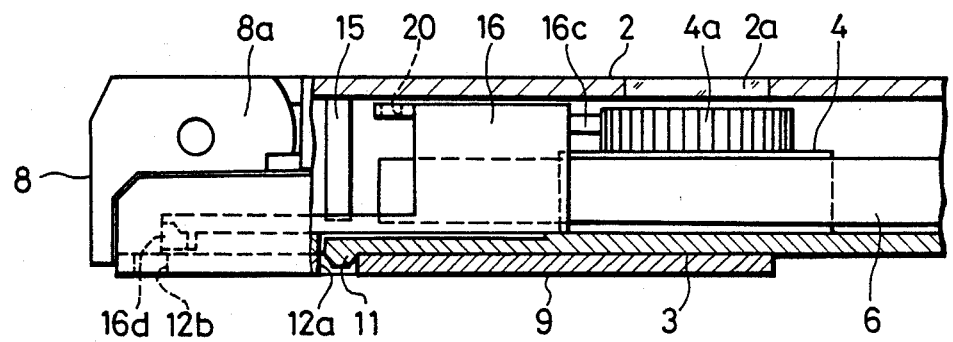
FIG. 10 is a fragmentary, cut-away side view illustrating the braking member, which was previously temporarily fastened, in a released condition.
Figure 11:
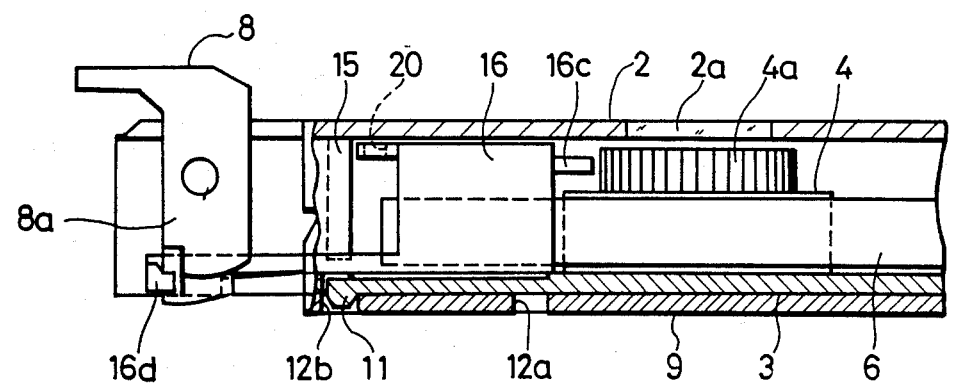
FIG. 11 is a fragmentary, cut-away side view of the magnetic tape cassette of the invention with its front lid opened.

When the front lid 8 is closed during non-use of the magnetic tape cassette, the braking member 16 locks the reel hub 4 by engaging the protrusions 16c of the brake member 16 with the ratchet wheels 4a of the reel hub 4 as shown in FIG. 10. On the other hand, when the magnetic tape cassette is in use and the front lid 8 is rotated upward to open the magnetic tape cassette, the braking member 16 is slidably moved forward (to the left in FIG. 10) in unison with the rotation of the front lid 8 to withdraw its protrusions 16c from the ratchet wheels 4a of the reel hubs 4. This releases hubs 4 from the locked state as shown in FIG. 11.

When the braking member 16 is slidably moved while the front lid is being closed and/or opened, the braking member 16 is prevented from being temporarily secured to the upper part 2 again. In other words, since the recess 20 is initially engaged with the limiter pin 15 at a position that it forward of the forwardmost sliding position of the braking member 16 as described above, the recess 20 and the limiter pin 15 are maintained in spaced-apart relation when the braking member 16 is slidably moved in association with the normal opening and/or closing operation of the front lid 8.

FIG. 12 illustrates another embodiment of the magnetic tape cassette according to the present invention. In this embodiment, the braking member 16 has circular protruding portions 20b, 20c formed thereon instead of recesses 20 and the upper part 32 has on its inner surface two pairs of protrusions 15a, 15b and 15c, 15d instead of limiter pins 15. The protrusions 15a, 15b and 15c, 15d are engaged with the circular protruding portions 20b, 20c just as the recesses 20 engage the limiter pins 15 in the first embodiment.

In accordance with the present invention, there is a difference between the full slidable stroke of which the braking member 16 is capable and the more limited lock-releasing stroke made by the braking member 16 in association with the opening operation of the front lid 8. This difference is utilized to temporarily secure the braking member 16 to the upper part 2 with a small pressure, and the braking member 16 is released from being temporarily secured to the upper part 2 only after the upper part 2 and the lower part 3 are assembled to form a single unit. The braking member 16 can therefore be smoothly slid in connection with the opening and/or closing operation of the front lid 8 without trouble. Thus, as compared to the conventional case where the braking member 16 is temporarily secured to the upper part 2 by caulking, the front lid 8 can be more positively opened and the reel hubs 4 can be more positively locked, thus avoiding the risk of the mis-loading.

Further, since the convex strips 21 (FIGS. 6 to 8) are formed on the braking member 16 and the guide grooves 22 are formed on the upper part 2 in a corresponding relation thereto in the embodiments of the present invention, when the braking member 16 is temporarily secured to the upper part 2, the braking member 16 can be accurately positioned with ease by engaging the convex strips 21 and the guide grooves 22. Also, after the assembly, the convex strips 21 and the guide grooves 22 serve as a sliding guide for the braking member 16, thus making it possible to slide the braking member 16 smoothly.

Furthermore, according to the magnetic tape cassette of the present invention, since the braking member 16 is temporarily secured to the upper part 2 by engaging the recesses 20 with the limiter pins 15 provided as the fixing portions with a small pressure, the caulking process of the prior art is not required. Accordingly, a melting machine for such a caulking process or the like is not needed. This simplifies the manufacturing process and reduces its cost.

Also, according to the embodiment of the present invention as described above, since the limiter pins 15 of the existing slider locking members are employed as the fixing portions with which the recesses 20 of the braking member 16 are engaged, it is not necessary to form new fixing portions on the upper part 2. In addition, since in contrast to the prior art a caulking pin is not needed to support the braking member 16 provided on the upper part 2, the inside of the magnetic tape cassette is less crowded. This is particularly advantageous in a magnetic tape cassette for PCM recording and/or reproducing, since in such magnetic tape cassettes the interior space is quite limited.

Also, it is needless to say that the fixing portion with which the braking member 16 is engaged with a small pressure is not limited to the limiter pin 15, but other fixing portions may be employed that protrude from the upper part 2.

Further, while in one embodiment of the present invention the recess 20 is formed on the braking member 16 and the fixing portion to be engaged with the recess 20 is formed on the upper part 2, an opposite relationship therebetween can be made. In other words, it is possible, for example, to form the recess 20 on the upper part 2 and to add the fixing pins to the braking member 16 as the fixing portions.

The description of the preferred embodiment of the invention set out above is presented only by way of example; many modifications and variations thereof can be effected by anyone having ordinary skill in the art without departing from the spirit and scope of the novel concepts of the invention, so that the scope of the invention should be determined only by the appended claims.

We claim as our invention:

1. A magnetic tape cassette having a cassette housing formed of an upper part and a lower part combined during assembly to form a unit, a front lid that can be moved between an open position in which it opens the cassette housing and a closed position in which it closes the cassette housing, a pair of reel hubs rotatably mounted within the cassette housing for winding a tape thereon, a braking member mounted within the cassette housing in such a manner as to be slidable in a front to back direction, and means for moving said braking member slidably over a given range backward to lock the reel hubs from being rotated when the front lid is moved to the closed position and forward to release said reel hubs from a locked state when the front lid is moved to the open position, said magnetic tape cassette comprising:

a fixing portion provided on said upper part; and an engaging portion provided on said braking member, said engaging portion being engageable with said fixing portion with a small pressure when said braking member is located at a position outside said range, whereby said braking member can be temporarily secured to said upper part by engaging said engaging portion with said fixing portion with a small pressure during assembly and released after said upper part and said lower part are combined to form said unit, said braking member then becoming slidable only within said range.

2. A magnetic tape cassette according to claim 1 in which said fixing portion on said upper part comprises at least one cylindrical pin and said engaging portion provided on said braking member is formed of at least one protrusion including a substantially circular engaging recess.

3. A magnetic tape cassette according to claim 1 in which said fixing portion on said upper part is formed of a pair of protrusions and said engaging portion on said braking member is a circular protrusion.

4. A magnetic tape cassette according to claim 1 wherein said cassette housing is formed with a cut-away recess portion into which a magnetic tape withdrawing guide system is insertable for withdrawing the magnetic tape from said cassette housing when said front lid is in said open position, further comprising a slide plate provided on said lower part, said slide plate being slidable between a rearward position wherein it opens said recess portion and a forward position wherein it closes said recess portion, and a slide plate locking lever also provided on said lower part and movable to lock said slide plate in a selected one of said rearward and forward positions, said fixing portion being formed as a pin provided in an opposing relation to said slide plate locking lever, said pin serving to limit movement of said slide plate locking lever to prevent breaking and excessive deformation thereof.

5. A magnetic tape cassette having a cassette housing formed of an upper part and a lower part combined during assembly to form a unit, a front lid that can be moved between an open position in which it opens the cassette housing and a closed position in which it closes the cassette housing, a pair of reel hubs rotatably mounted within the cassette housing for winding a tape thereon, a braking member mounted within the cassette housing in such a manner as to be slidable in a front to back direction, and means for moving said braking member slidably over a given range backward to lock the reel hubs from being rotated when the front lid is moved to the closed position and forward to release said reel hubs from a locked state when the front lid is moved to the open position, said magnetic tape cassette comprising:

a fixing portion provided on one of said upper part and said braking member; and an engaging portion provided on the other of said upper part and said braking member, said engaging portion being engageable with said fixing portion with a small pressure when said braking member is located at a position outside said range, whereby said braking member can be temporarily secured to said upper part by engaging said engaging portion with said fixing portion with a small pressure during assembly and released after said upper part and said lower part are combined to form said unit, said braking member then becoming slidable only within said range.

* * * * *